United States Patent
Foti et al.

(10) Patent No.: US 7,551,585 B2
(45) Date of Patent: Jun. 23, 2009

(54) SEAMLESS HANDOFF FOR MULTIMEDIA SERVICES

(75) Inventors: George Foti, Dollard des Ormeaux (CA); Lila Madour, Kirkland (CA)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 601 days.

(21) Appl. No.: 11/238,958

(22) Filed: Sep. 30, 2005

(65) Prior Publication Data

US 2006/0120287 A1     Jun. 8, 2006

Related U.S. Application Data

(60) Provisional application No. 60/632,532, filed on Dec. 3, 2004.

(51) Int. Cl.
*H04W 4/00*     (2006.01)
(52) U.S. Cl. ........................ 370/331; 455/436
(58) Field of Classification Search ............. 370/229, 370/331, 260, 328, 389, 401, 338
See application file for complete search history.

(56) References Cited

U.S. PATENT DOCUMENTS

| | | | | |
|---|---|---|---|---|
| 6,628,954 | B1 * | 9/2003 | McGowan et al. | 455/461 |
| 6,654,359 | B1 * | 11/2003 | La Porta et al. | 370/328 |
| 6,970,445 | B2 * | 11/2005 | O'Neill et al. | 370/338 |
| 7,366,152 | B2 * | 4/2008 | O'Neill et al. | 370/338 |
| 7,388,851 | B2 * | 6/2008 | Trossen | 370/331 |

(Continued)

FOREIGN PATENT DOCUMENTS

CA     2359040     3/2002

(Continued)

OTHER PUBLICATIONS

M. Handley et al., SIP: Session Initiation Protocol, Network Working Group, RFC 2543, Mar. 1999.

(Continued)

*Primary Examiner*—Ricky Ngo
*Assistant Examiner*—Ben H Liu
(74) *Attorney, Agent, or Firm*—Alex Nicolaescu; Ericsson Canada Inc.

(57) ABSTRACT

A method and Policy Decision Function node are provided for maintaining a multimedia session in an alive state for a mobile station following a release of a network attachment resulting from a handoff from a first Packet Data Node to a second Packet Data Node followed by a dormancy state of the mobile station. If both Packet Data Nodes are comprised into a same MultiMedia Domain, the Policy Decision Function informs an Application Function of the MultiMedia Domain that the multimedia session shall be maintained. Otherwise, if the two Packet Data Nodes are comprised into distinct MultiMedia Domains, a first Policy Decision Function, in addition to informing a first Application Function that the multimedia session shall be maintained, also fetches a context of the multimedia session. Further, the first Policy Decision Function transfers the context of the multimedia session to the first Packet Data Node, which in turn sends the context of the multimedia session to the second Packet Data Node. Subsequent to reactivation of the mobile station, a second Policy Decision Function transfers the context of the multimedia session from the second Packet Data Node to a second Application Function in a second MultiMedia Domain.

15 Claims, 5 Drawing Sheets

U.S. PATENT DOCUMENTS

| | | | |
|---|---|---|---|
| 7,391,724 B2* | 6/2008 | Alakoski et al. | 370/230 |
| 2003/0221016 A1* | 11/2003 | Jouppi et al. | 709/245 |
| 2004/0005894 A1* | 1/2004 | Trossen et al. | 455/436 |
| 2004/0018841 A1 | 1/2004 | Trossen | 455/436 |
| 2004/0187021 A1* | 9/2004 | Rasanen | 713/200 |
| 2004/0205193 A1* | 10/2004 | Hurtta et al. | 709/227 |
| 2004/0218607 A1* | 11/2004 | Hurtta et al. | 370/395.21 |
| 2004/0223602 A1* | 11/2004 | Honkasalo et al. | 379/243 |
| 2004/0233866 A1* | 11/2004 | Bossoli et al. | 370/328 |
| 2005/0111409 A1* | 5/2005 | Spear et al. | 370/331 |
| 2005/0122945 A1* | 6/2005 | Hurtta | 370/338 |
| 2005/0157673 A1* | 7/2005 | Verma et al. | 370/328 |
| 2005/0249176 A1* | 11/2005 | O'Neill et al. | 370/338 |
| 2005/0265278 A1* | 12/2005 | Hsu et al. | 370/328 |
| 2007/0121508 A1* | 5/2007 | Fodor et al. | 370/235 |

FOREIGN PATENT DOCUMENTS

GB    2378090    1/2003

OTHER PUBLICATIONS

3GPP TS 29.207, V6.2.0, 3rd Generation Partnership Project; Technical Specification Group Core Network; Policy Control Over Go Interface (Release 6), Dec. 2004.

3GPP TS 29.209, V6.1.0, 3rd Generation Partnership Project; Technical Specification Group Core Network; Policy Control Over Gq Interface (Release 6), Dec. 2004.

PCT Search Report of Mar. 17, 2006 from corresponding application PCT/IB2005/053976.

S. Mukherjee et al., Always On: A New Paradigm for Wireless Networks, Personal,Indoor and Mobile Radio Communications, 2004. PIMRC 2004. 15th IEEE International Symposium on Barcelona, Spain Sep. 5-8, 2004, Piscataway, NJ, USA, IEEE, vol. 1, Sep. 5, 2004, pp. 226-233.

* cited by examiner

SEAMLESS HANDOFF FOR MULTIMEDIA SERVICES

PRIORITY STATEMENT UNDER 35 U.S.C. S.119(e) & 37 C.F.R. S.1.78

This non-provisional patent application claims priority based upon the prior U.S. provisional patent application entitled "Seamless Inter MMD/SIP Domain Handoff in a CDMA2000 System", application No. 60/632,532, filed Dec. 3, 2004, in the name of George FOTI and Lila MADOUR.

BACKGROUND OF THE INVENTION

1. Field of the Invention

The present invention relates to a method and a node for maintaining a multimedia session in an alive state for a mobile station following a release of a network attachment resulting from a handoff from a first Packet Data Node to a second Packet Data Node and following dormancy state of the mobile station.

2. Description of the Related Art

IP Multimedia Subsystem (IMS) supports multimedia sessions between an end-user terminal, for instance a Mobile Station (MS), and IP (Internet Protocol) multimedia servers and content providers. A generic name for an IP multimedia server is an Application Function (AF). The AF offers applications that require the control of IP bearer resources. An example of a service supported by the IMS may be illustrated by a discussion of SIP (Session Initiation Protocol), which is a signaling protocol designed for support of telephony, event notifications, interactive gaming, instant messaging and other interactive communication sessions between users over Internet by use of multimedia sessions. SIP is described in RFC 2543 of IETF (Internet Engineering Task Force). SIP messages between the MS and a network are carried over a multimedia session. The multimedia session is called SIP session when SIP is used as a call control mechanism. A popular mobile application of SIP is named PTT (Push To Talk). PTT uses SIP as the call control mechanism. PTT carries Voice over Internet Protocol (VoIP) by establishing a VoIP connection over a multimedia session. A mobile user can initiate a SIP session enabling him to communicate with peers by use of a PTT call. To talk to or listen to peers once the SIP session has been established, the user simply needs to press on a single PTT button on his MS. By pressing this button, the user makes his MS connect to a Radio Access Network (RAN), establish a packet data session with a Packet Data Node (PDN), and send a SIP message over the SIP session to an AF, also named application server, which is in control of the PTT call. When the user no longer needs to talk to or listen to his peers, he may release his communication by releasing the button, without releasing the SIP session. While there is no active communication, the radio link is released, normally following a few minutes of inactivity. The user may resume communication with his peers, maybe several hours later, by simply pressing again on the same button. The SIP session, hence the multimedia session between the MS and the application server, may have remained alive for a silent period lasting for several hours. It is by maintaining the multimedia session that a VoIP connection may be resumed almost instantaneously when the user desires to communicate again.

CDMA2000 systems, as defined by 3GPP2 ($3^{rd}$ Generation Partnership Project 2), support circuit switched connections as well as packet data connections. To set up a circuit switched connection, the CDMA2000 system sets up: (i) a radio link between a Mobile Station (MS) and a Radio Access Network (RAN) and (ii) a terrestrial link between the RAN and a Mobile Switching Center (MSC). In a circuit switched connection, a call release implies releasing all resources allocated for serving the call. A packet data connection, also named packet data session, is characterized by setting up of a radio link between the MS and the RAN and by setting up of a network attachment comprising a Point to Point (PPP) connection between the MS and a Packet Data Node (PDN), named Packet Data Service Node (PDSN) in CDMA2000 systems, connected to the RAN, also by use of a terrestrial link. The PDSN assigns an IP address to the MS. In cases where the packet data session is established for the purpose of using a multimedia service, a multimedia session may further be established between the MS and an Application Function. In a packet data session, when the MS is neither sending nor receiving data and has been inactive for a certain period, the radio link between the MS and the RAN is released. Despite this release of the radio connection, the network attachment comprising the PPP connection between the MS and the PDSN and the IP address assigned to the MS are still maintained. This state is called dormancy. By maintaining the network attachment, the PPP connection and the IP address while the MS is in the dormancy state, the multimedia session is maintained in an alive state. Hence, a service may be reactivated quickly when there is data to be sent either to or from the MS.

General Packet Radio Service (GPRS) systems, as defined by 3GPP ($3^{rd}$ Generation Partnership Project), are very similar to the CDMA 2000 systems mentioned hereinabove in that they also support packet data sessions by setting up a radio link between a MS and a RAN, and further setting up a network attachment comprising an IP connection between the MS and a PDN, named GGSN (Gateway GPRS Serving Node) in GPRS systems. Like the PDSN in a CDMA 2000 system, the GGSN assigns an IP address to the MS.

FIG. 1 shows an exemplary IMS architecture 100 for interworking between a Application Function (AF) 110, a PDN 120 and a PDF (Policy Decision Function) 130, serving a MS 140 in an IP Multimedia Subsystem in accordance with the Prior Art. While for clarity reasons, a single AF, PDF and PDN are shown on FIG. 1, a typical IMS architecture would most probably include a number of PDNs, PDFs and AFs. A network attachment 160 is shown between the PDN 120 and the MS 140. The network attachment 160 is set up transparently over a RAN (not shown). Those knowledgeable with the IP Multimedia Subsystem will recognize that a P-CSCF (Proxy Call Session Control Function) is a well-known example of possible Application Function (AF) types.

The PDF 130 role in the IMS architecture is to coordinate activities between a bearer plane and a control plane in a MMD (MultiMedia Domain). The bearer plane transports user data between network entities involved in a call. Examples of such network entities comprise the MS 140, the PDN 120 and Internet. The control plane supports call control such as SIP messages, as well as other applications and services. An example of call control message is the aforementioned SIP message initiated by the MS 140 when the user presses a PTT button on the MS. An example of a policy enforced by the PDF comprises translating of a service request parameter sent from the MS 140 as a result of a PTT session initiation into a Quality of Service requirement. The AF 110 maintains in a database a context of the multimedia session, comprising for example an IP address of the MS 140, filters and header compression information.

As shown on FIG. 1, the PDF 130 interfaces with the PDN 120 on one hand via a Go interface 140, and with the AF 110 on the other hand via a Gq interface 150. The Go interface 140 is described in 3GPP TS 29.207 V6.2.0 (2004-12). The Gq interface 150 is described in 3GPP TS29.209 V6.1.0 (2004-12). Events taking place at the session control plane, in the AF 110, are reported to the PDN 20, via the PDF 130, for authorization and enforcement. Likewise, events at the bearer plane, in the PDN 20, are reported to the session control plane via the PDF 130, so that they can be properly acted upon, in a manner that depends on the event type.

One of the events reported to the PDF by the PDN is when an underlying bearer is released, for example when the network attachment 160 between the MS and the PDN is torn down, also resulting in a release of the PPP connection and of the IP address assigned to the MS. The PDF in turn reports that event to the AF. Currently, the AF is required to clear the multimedia session, for example a SIP session, including its context, should such an event be reported. This is done to ensure that the events that both the control and the bearer plane report separately do match, as a means to also ensure consistency in charging information for the multimedia session in place.

When performing a fast handoff between PDNs, the MS moves from a first PDN to a second PDN using procedures defined as fast handoff in X.S0011 and IOS 4.3 specifications of the 3GPP2. In fast handoff, the MS maintains the network attachment 160 comprising the PPP connection and a current packet data session anchored in the first PDN until the MS goes dormant or the MS disconnects. During that period before the dormancy state, as the MS is connected to the second PDN, this second PDN provides a tunnel between the MS and the first PDN. If for example a PTT call is in an active state, implying that the user is actively speaking to or listening to a peer, the multimedia session comprising the VoIP connection is maintained over the PPP connection between the MS and the first PDN, until the end of voice activity, when the MS enters the dormancy state.

Considering now a traffic case where a mobile hands off from a first PDN to a second PDN. In this traffic case, clearing of IMS sessions occur when the network attachment comprising the PPP connection is released and the IP address is cleared, at the time when the MS becomes dormant. This clearing of IMS sessions overlooks legitimate traffic cases where it would be advantageous to maintain call connections. Specifically in the case of VoIP session, when there is a handoff from one SIP domain to another SIP domain, a call is not allowed to continue. There is no transfer of call information between the first PDF and the second PDF. Currently, if the X.S0011 and IOS 4.3 specifications are followed, the call is cleared. For example in the case of a PTT session, the user will have to re-establish a new packet data session and a new multimedia session with a new IP address before resuming communication with his peers. This re-establishment of the new multimedia session implies more actions on the part of the user than simply pressing on one PTT button. This situation renders a service such as Push To Talk much less efficient and much less enjoyable for the user.

U.S. Pat. No. 6,654,359 issued in the names of La Porta et al. on Nov. 25, 2003 (hereinafter called La Porta) enables a MS handoff from a first, home or foreign network, to a second foreign network. La Porta provides a care-of-address to the MS, for tunneling purposes, so that it can continue using the same IP address without disruption. Further handoffs are transparent to the home network since the care-of-address does not change within the foreign network.

Canadian patent application number 2 359 040 published in the names of Hasan and Tiburtius on Sep. 27, 2001 (hereinafter called Hasan) describes a PPP connection established between a PDN and a mobile terminal, based on the received PDN information. The PPP connection is extended from the PDN to another PDN and the mobile node is informed that the handover is complete. The method of this invention requires setting up a second PPP connection with the second PDN. Hasan is only concerned with the handling of PPP connections between the access network and the PDN. It does not relate to the impacts of handoffs between the PDN and the rest of the network.

UK patent application number GB 2 278 090 published in the names of Cheung and Barrett on Sep. 27, 2001 (hereinafter called Cheung) provides a method for dynamic sharing of session management information upon handoff from a second generation to a third generation mobile network. Information is shared between GPRS Service Nodes (GSN) or between Mobile Switching Centers/Visitor Location Registers (MSC/VLR). Information is exchanged directly between the two systems, without having to involve a HLR (Home Location Register) until the end of the handoff process, in order to speed up the handoff. The disclosure makes no mention of a means or method to maintain a multimedia connection upon handoff. Specifically, Cheung does not propose any solution to the problem of maintaining a proper match between control plane and bearer plane events.

There would be a clear advantage of maintaining a multimedia session in an alive state with its full context, for a mobile station, when a network attachment is released following a handoff between packet data nodes, later followed by a dormancy state.

SUMMARY OF THE INVENTION

A first aspect of the present invention is directed to a method of maintaining a multimedia session for a Mobile Station (MS) when a network attachment to said MS has been released as a result of said MS being handed over from a first Packet Data Node (PDN) to a second PDN, by fetching a context of the multimedia session from a Multimedia Domain (MMD) to the first PDN. The method comprises the steps of sending a state report message from the first PDN to a first Policy Decision Function (PDF) and further sending a network detach message from the first PDF to a first Application Function (AF), indicating to said first AF that said multimedia session is requested to be maintained and requesting to fetch the context of the multimedia session for transferring between said first and second PDNs, returning to the first PDF a response comprising said context, and further returning to the first PDN an acknowledgement, also returning said context. Following receipt of the acknowledgement and of the context by the first PDN, said first PDN sends the context of the multimedia session to the second PDN.

A second aspect of the present invention is directed to a method of maintaining a multimedia session for a Mobile Station (MS) when a network attachment to said MS has been released as a result of said MS being handed over from a first Packet Data Node (PDN) to a second PDN, by determining whether the first PDN and the second PDN are associated with, or comprised in, a same MultiMedia Domain (MMD) and, in case the first and second PDNs are not associated with, or comprised in, the same MMD, transferring a context of the multimedia session from a first MMD to a second MMD. The method comprises the steps of sending a report message from the first PDN to a first Policy Decision Function (PDF) and further sending a network detach message from the first PDF to a first Application Function (AF), indicating to said first AF that said multimedia session is requested to be maintained and, if the first and second PDNs are not associated with, or comprised in, the same MMD, indicating that the context of the multimedia session should be fetched for transferring between said first and second PDNs, returning to the first PDF a response, said response comprising said context if fetched by the AF, and further returning to the first PDN an acknowledgement, also returning said context if fetched by the AF. Following receipt of the acknowledgement by the first PDN, said first PDN sends the context of the multimedia session to the second PDN if said context was received with said acknowledgement.

A third aspect of the present invention is directed to a Policy Decision Function (PDF) for maintaining a multimedia session for a Mobile Station (MS) following a release of network attachment resulting from a handoff of the MS from a first Packet Data Node (PDN) to a second PDN. Said PDF comprises a Go interface input port for receiving from said first PDN a state report message indicating that the MS has been handed over from said first PDN to said second PDN, a Gq interface sending port for sending to an Application Function (AF) a network detach message requesting to maintain said multimedia session and requesting to fetch a context of said multimedia session for transferring between PDNs, a Gq interface input port for receiving from said AF an acknowledgement and for receiving said context, and a Go interface sending port for sending an acknowledgement and for sending said context to said first PDN.

A fourth aspect of the present invention is directed to a Policy Decision Function (PDF) for maintaining a multimedia session for a Mobile Station (MS) following a release of network attachment resulting from a handoff of the MS from a first Packet Data Node (PDN) to a second PDN. Said PDF comprises a Go interface input port for receiving from said second PDN a context of said multimedia session, and a Gq interface sending port for sending to an Autonomous Function (AF) said context of said multimedia session.

BRIEF DESCRIPTION OF THE DRAWINGS

For a more detailed understanding of the invention, for further objects and advantages thereof, reference can now be made to the following description, taken in conjunction with the accompanying drawings, in which.

DETAILED DESCRIPTION OF THE PREFERRED EMBODIMENT

Figure 1:
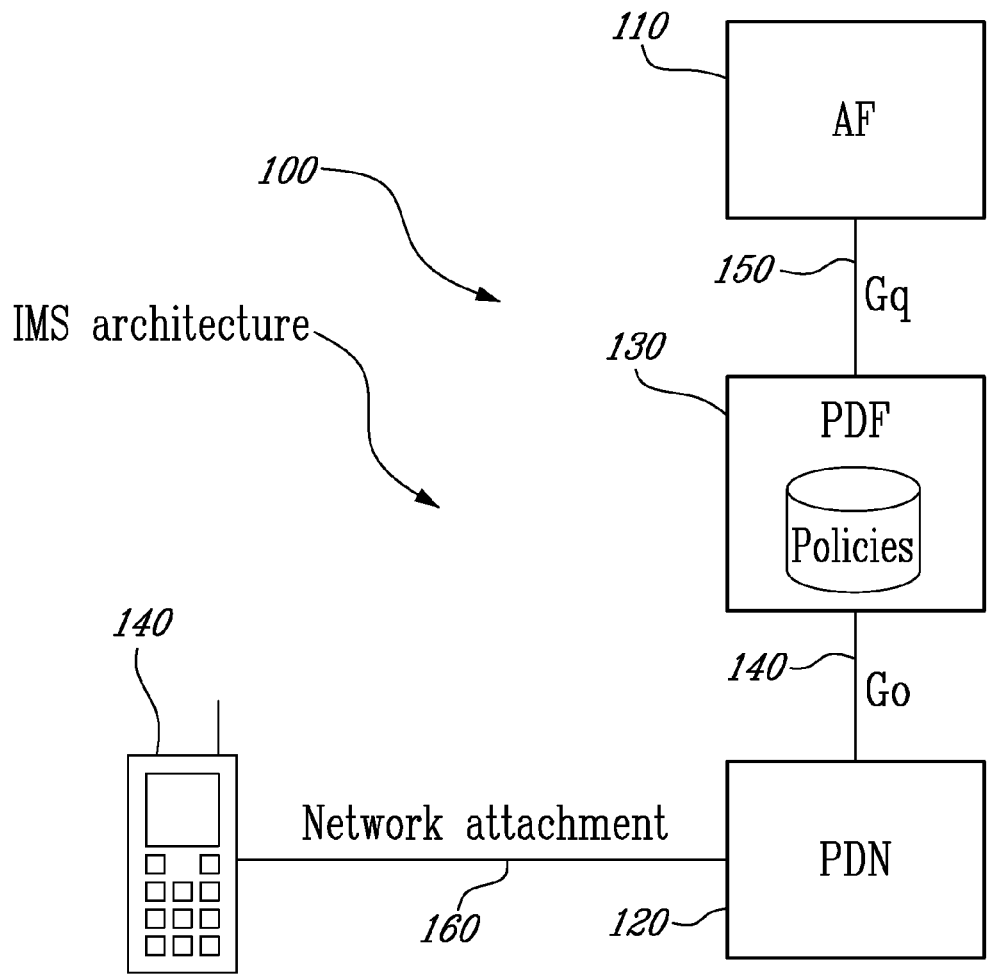
FIG. 1 (Prior Art) shows a simplified architecture for interworking between an AF, a PDN and a PDF.

The innovative teachings of the present invention will be described with particular reference to various exemplary uses and aspects of the preferred embodiment. However, it should be understood that this embodiment provides only a few examples of the many advantageous uses of the innovative teachings of the invention. In general, statements made in the specification of the present application do not necessarily limit any of the various claimed aspects of the present invention. Moreover, some statements may apply to some inventive features but not to others. In the drawings, like or similar elements are designated with identical reference numerals throughout the several views.

The present invention provides a method and a node for maintaining a multimedia session in an alive state for a Mobile Station (MS) when said MS has been handed over from a first PDN in a first MultiMedia Domain to a second PDN in a second MultiMedia Domain. A result of this handoff is a release, or loss, of a network attachment between the MS and the first PDN. Various air interface specifications and other prior art may mention a service, a network or a session wherein a MS or, alternatively, a mobile node (MN), a mobile terminal (MT), a user agent (UA) or a user equipment (UE) is involved. Those of ordinary skills in the art will understand that the terms MS, MN, MT, UA and UE are synonymous in the context of the present invention. The term "alive multimedia session" is herein preferred to "active multimedia session", though both are synonymous, in order to avoid any confusion with terms such as an "active" state of the radio link between the Mobile Station and the Radio Access Network. Examples of "multimedia sessions" may comprise a VoIP session, a videoconference over IP session, a gaming over IP session, or any real time service involving a mobile user with another user or with a server, when an IP connectivity is used. A loss of network attachment may result directly from a handoff between PDNs. In the case of CDMA2000, a loss of network attachment results from a handoff between PDNs followed by a dormancy state of a MS.

Figure 2:
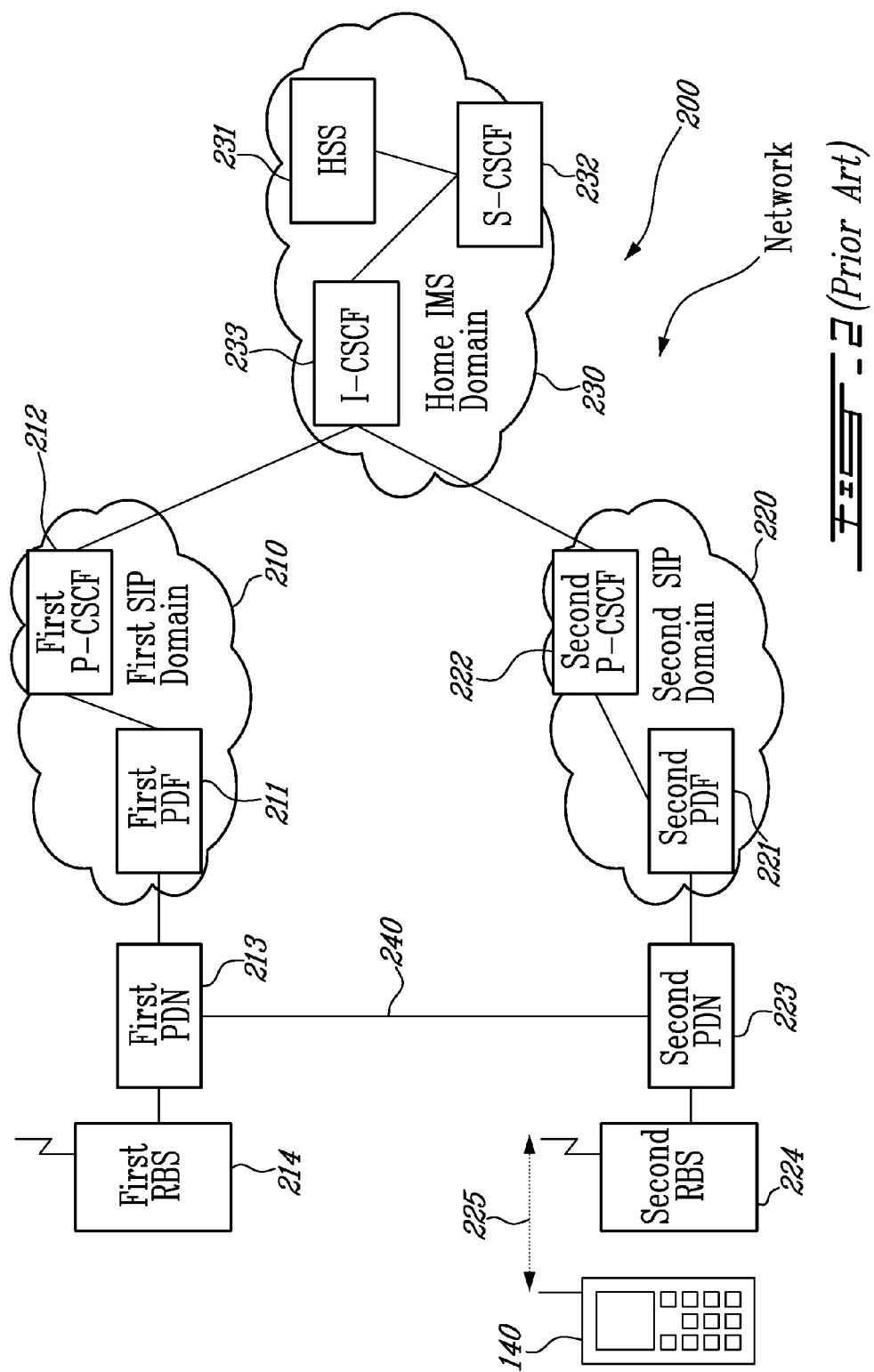
FIG. 2 (Prior Art) shows an exemplary network view of various nodes supporting a multimedia session for a multimedia service involving a handoff from a first to a second MultiMedia Domain.

Reference is now made to FIG. 2, which shows an exemplary network 200 for multimedia applications comprising two distinct MultiMedia Domains, herein represented as SIP domains 210 and 220, and a Home IMS Domain 230. A first SIP domain 210 comprises a first PDF 211, a first P-CSCF 212 and a first PDN 213 along with a first RAN (not shown), itself comprising at least one first RBS (Radio Base Station) 214. Those knowledgeable with the IP Multimedia Subsystem will recognize that a P-CSCF is a well-known example of possible Application Function types. Likewise, a second SIP domain 220 comprises a second PDF 221, a second P-CSCF 222 and a second PDN 223 along with a second RAN (not shown), itself comprising at least one second RBS (Radio Base Station) 224. A Home IMS Domain 230 comprises a HSS (Home Subscriber Server) 231 which stores data for all end-user and service-related data of the IMS, a S-CSCF (Serving Call Session Control Function) 232 which performs session control, maintains session state and interacts with service platforms, and a I-CSCF (Interrogating Call Session Control Function) 233 which is used by the first and second SIP domains as a point of contact to the Home IMS Domain.

In the network of FIG. 2, the MS 140 initiates a packet data session and a multimedia session, for example a user has initiated a PTT call, with the first RBS 214 connected to the first PDN 213 of the first SIP domain 210. A first radio link (not shown) is set up between the MS 140 and the first RBS 214, and the first RBS 214 informs the first PDN 213 of this set up. The first PDN 213 sets up a network attachment between the MS 140 and the first PDN 213. As a part of setting up the network attachment, the PDN sets up a PPP connection between itself and the MS, allocates an IP address to the MS 140 and further signals to the first PDF 211 to inform about the multimedia session. The first PDF 211 in turn informs the first P-CSCF 212 which in turn completes the multimedia session with the S-CSCF 232 in the Home IMS Domain 230.

At some time during the multimedia session, the MS 140 goes into handoff, meaning that it has moved into a radio coverage area of a second RBS 224, said second RBS 224 being connected to the second PDN 223 of the second SIP domain 220. As a result of the MS 140 moving into the coverage area of the second RBS 224, the first radio link is released and a second radio link 225 is established between the MS 140 and the second RBS 224. A link, also referred to as a tunnel 240, is set up between the second PDN 223, also known as a target PDN, and the first PDN 213, also known as a serving PDN. As a result of setting up the tunnel 240, the multimedia session with the MS 140 is still maintained at the first SIP domain 210.

When, a moment later, there happens a voice activity pause in the PTT call, the second radio link 225 between the MS 140 and the second RBS 224 is released and the MS 140 is placed in a dormant mode. The tunnel 240 between the second PDN 223 and the first PDN 213 is also released. As a result, the first PDN 213 releases the network attachment comprising the PPP connection, de-allocates the IP address of the MS 140 and informs the first PDF 211 of the loss of network attachment. The first PDF 211 transfers information about this event to the first P-CSCF 212. Because the first P-CSCF 212 no longer has the IP address of the MS 140, it loses any capability to reconnect to the MS 140. As a result, the first P-CSCF 212 releases the multimedia session by signaling to the Home IMS Domain 230 that the multimedia session is released and by clearing the multimedia session context. The release of the multimedia session will later prevent a fast call set up of the PTT call, should the user desire to resume a PTT conversation. Instead, the user will need to initiate a new multimedia session as part of a new PTT call set-up.

It should be understood that while FIG. 2 shows an exemplary prior art situation involving two distinct SIP domains, a similar problem would occur upon handoff of a MS 140 between a first RBS and a second RBS connected to two PDNs wherein said two PDNs would belong to a same MultiMedia Domain comprising a single PDF and a single P-CSCF. Because a first PDN would still need to release a network attachment along with a PPP connection to the MS and an IP address allocated to the MS, said PDN would still need to inform the PDF of the loss of network attachment and the PDF would still need to inform the P-CSCF. The P-CSCF would still no longer have an IP address of the MS, preventing any capability to reconnect to the MS. Hence, the P-CSCF would still need to release the multimedia session.

It should also be understood that while an example of a PTT call has been described herein, the same problem would apply in a multimedia session for any type of multimedia application, whether this type of multimedia application uses SIP signaling or another signaling protocol such as, for example H.323. It should also be understood that the present invention applies to all kinds of MultiMedia Domains, not limited to SIP domains as described in FIG. 2. Likewise, the same problem would occur upon handoff of a multimedia session from a first PDN in a first access technology such as CDMA2000 to a second PDN in a second access technology such as WLAN.

Figure 3:
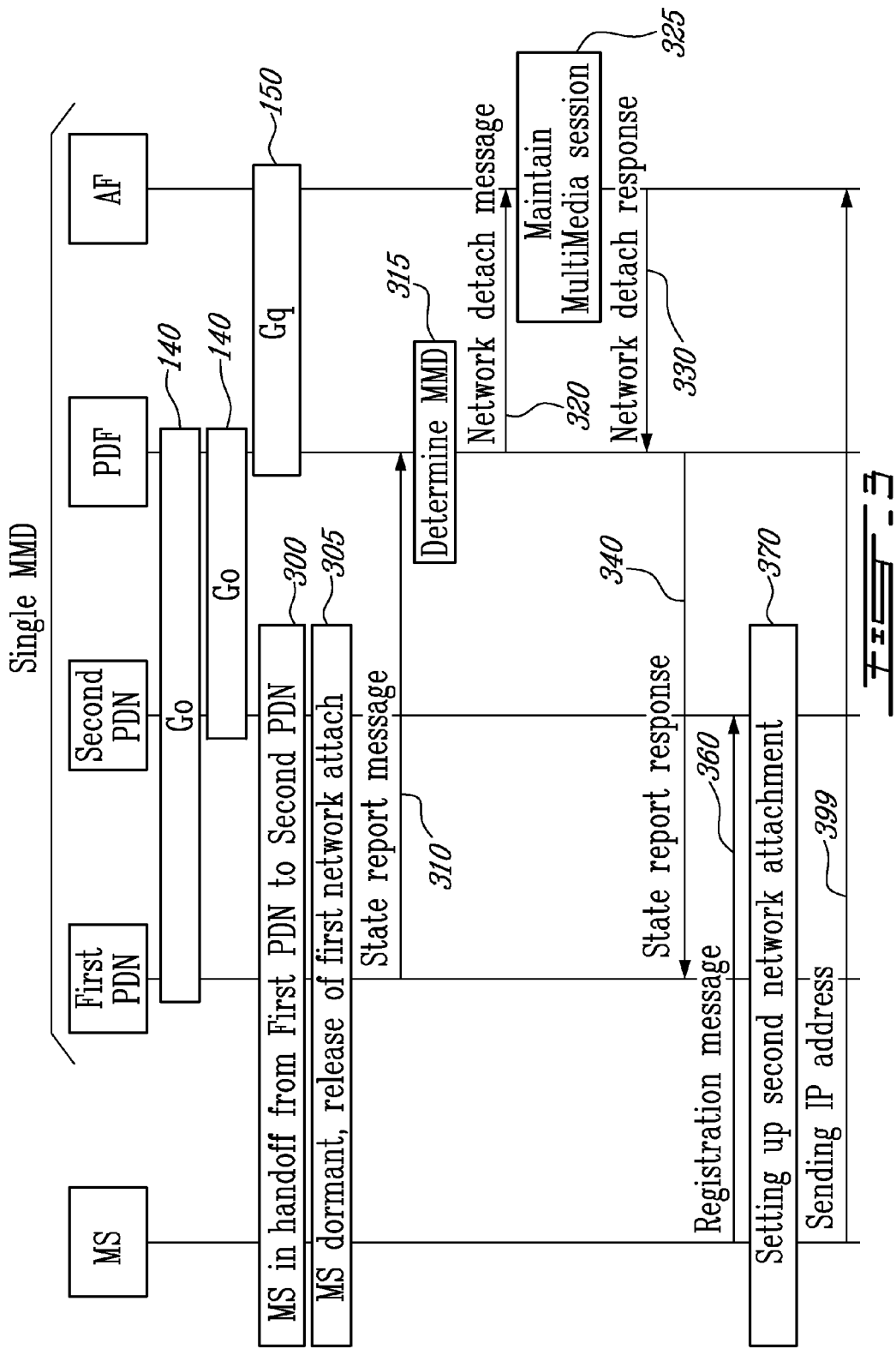
FIG. 3 is a signal flow diagram of an exemplary use of the preferred embodiment of the present invention.

Reference is now made to FIG. 3, which describes an exemplary use of the present invention wherein two PDNs, a single PDF and a single AF all belong to a same MMD. FIG. 3 shows a signaling sequence involving a MS, a first PDN, a second PDN, a PDF and an AF. Interfaces Go 140 and Gq 150 are shown. As regards to Go 140, it should be understood that the PDF communicates with the first PDN and with the second PDN with identical instances of the Go interface. In this exemplary use of the present invention, the MS is involved in a PTT call with one or more peers (not shown) connected further in the network 200. The MS is connected to the first PDN through a RAN (not shown). The first PDN has earlier set up a first network attachment comprising a first PPP connection to the MS and has allocated a first IP address to the MS. Said first IP address is used by nodes, for example by the AF, to communicate with the MS. The AF stores a context of the ongoing multimedia session, said context comprising at least a state, the first IP address, and possibly comprising further elements such as filters and header compression information. A radio connection is in active state, meaning that there is some level of voice activity carried between the MS and the peers over nodes in the MMD.

At step 300, a MS is in handoff from the first PDN (serving PDN) to the second PDN (target PDN). The MS is currently served by a RAN directly connected to the second PDN. Because the MS had earlier been allocated the first IP address from the first PDN, a tunnel 240 is used between the second PDN and the first PDN. Hence, packet data for the ongoing multimedia session travels between the MS, through the second PDN, through the tunnel 240 to the first PDN. At step 305, the MS becomes dormant. The first PDN releases the first network attachment 160 and the first PPP connection to the MS and releases the first IP address of the MS. The tunnel 240 is also released at the same time. At step 310, the first PDN sends a state report message to the PDF, with an indication of the loss of the first network attachment. At the same step 310, according to an aspect of the present invention, the state report message also includes an identity of the second PDN. At step, 315 the PDF looks at the second PDN identity and determines that it is in the same MMD as the first PDN. At step 320, the PDF sends to the AF a network detach message indicating that although the first network attachment was released, the multimedia session should be maintained, or kept alive. At step 325, responsive to said network detach message, the AF maintains the multimedia session. The AF sends an acknowledgement to the PDF within a network detach response at step 330. The PDF then sends an acknowledgement to the first PDN within a state report response at step 340.

At this point, according to the present invention, information was transferred between the first PDN, the PDF and the AF indicating that the multimedia session needs to be maintained and acknowledgements were sent back to the PDF and to the first PDN. Since both the first and the second PDN are part of the same MMD, the AF will continue later serving the multimedia session. Hence, the AF has conserved the context of the multimedia session.

At step 360, the MS becomes active again and connects to the second PDN, for example by sending a registration message. As a result, the second PDN sets up a second network attachment comprising a second PPP connection to the MS and assigns a second IP address to the MS at step 370. The MS sends the second IP address to the AF at step 399, e.g. by use of a SIP update message. As the AF has maintained the multimedia session along with its context, said multimedia session may continue.

Figure 4:
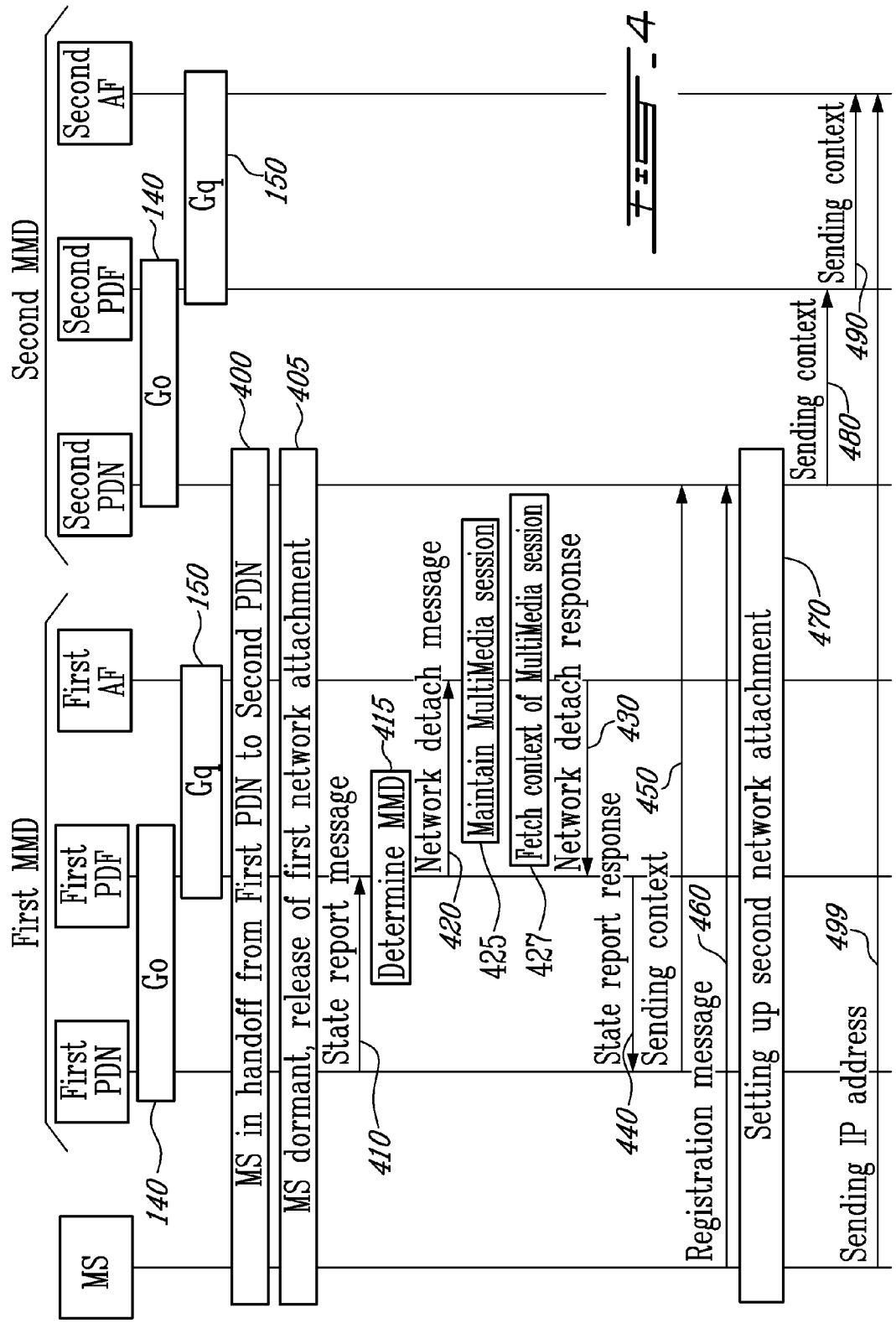
FIG. 4 is a signal flow diagram showing another exemplary use of the preferred embodiment of the present invention.

Reference is now made to FIG. 4, where another exemplary use of the present invention is described wherein two PDNs belong to distinct MMDs. FIG. 4 shows a signaling sequence involving a MS, a first PDN, a first PDF and a first AF, all comprised into a first MMD. FIG. 4 additionally shows a second PDN, a second PDF and a second AF, said second PDN, PDF and AF being comprised into a second MMD. Interfaces Go 140 and Gq 150 are shown. As regards to Go 140, it should be understood that the first PDF communicates with the first PDN and the second PDF communicates with the second PDN with identical instances of the Go interface. Likewise, as regards to Gq 150, it should be understood that the first PDF communicates with the first AF and the second PDF communicates with the second AF with identical instances of the Gq interface. In this exemplary use of the present invention, the MS is involved in a PTT call with one or more peers (not shown) connected further in the network 200. The MS is connected to the first PDN through a RAN (not shown). The first PDN has allocated a first IP address to the MS. Said first IP address is used by nodes, for example by the first AF, to communicate with the MS. The first AF stores a context of the ongoing multimedia session, said context comprising at least a state, the first IP address, and possibly comprising further elements such as filters and header compression information. A radio connection is in active state, meaning that there is some level of voice activity carried between the MS and the peers over nodes in the first MMD.

At step 400, a MS is in handoff from the first PDN (serving PDN) to the second PDN (target PDN). The MS is currently served by a RAN directly connected to the second PDN. Because the MS had earlier been allocated the first IP address from the first PDN and because a first network attachment comprising a first PPP connection exists between the MS and the first PDN, a tunnel 240 is used between the second PDN and the first PDN. Hence, packet data for the ongoing multimedia session travels between the MS, the second PDN, through the tunnel 240 to the first PDN. The first MMD is serving the multimedia session. At step 405, the MS becomes dormant and the first PDN releases the first network attachment 160 and the first PPP connection to the MS and the first IP address of the MS. The tunnel 240 is also released at the same time. At step 410, the first PDN sends a state report message to the first PDF, with an indication of the loss of the first network attachment. At the same step 410, according to an optional aspect of the present invention, the first state report message may also include an identity of the second PDN. At 415, if the identity of the second PDN was received, the first PDF looks at the second PDN identity and determines whether or not the second PDN is comprised in, or associated with, the first MMD. At 420, the first PDF sends to the first AF a network detach message indicating that although the first network attachment was released, the multimedia session should be maintained. At the same step 420, if the first PDF has determined that the second PDN is not in the same MultiMedia Domain, the network detach message also requests that a context of the multimedia session is to be fetched. In an alternate aspect of the present invention, the state report message of step 410 does not comprise any identity of the second PDN. In this alternate aspect, the PDF does not perform a determination of a PDN association with a MMD at step 415. In this case, the network detach message of step 420 unconditionally comprises a request to fetch the context of the multimedia session. This alternative provides an added benefit of enabling backward compatibility between a PDN having not implemented all aspects of the present invention, and a PDF built according to the preferred embodiment of the present invention. In the exemplary use of FIG. 4, the first and second PDNs are associated with two distinct MMDs, and fetching is requested. At step 425, responsive to said network detach message, the first AF maintains the multimedia session. Because in the present example the network detach message requests that the context of the multimedia session is to be fetched, the first AF fetches said context at step 427. Fetching of the multimedia session context will later enable a transfer of said context from the first PDN to the second PDN. The first AF sends a network detach response to the first PDF comprising an acknowledgement along with the context of the multimedia session, at step 430. The first PDF then sends a state report response to the first PDN comprising an acknowledgement along with the context of the multimedia session, at step 440. At step 450, the first PDN sends the context of the multimedia session to the second PDN.

At this point, according to the present invention, information was transferred between the first PDN, the first PDF and the first AF indicating that the multimedia session needs to be maintained, meaning that the multimedia session needs to be kept in an alive state, the multimedia session context was fetched and acknowledgements were sent back to the first PDF and to the first PDN, along with the multimedia session context. Finally, the context was sent from the first PDN to the second PDN. In a case where the first and the second PDN are part of two distinct MMDs, the first AF will no longer be serving the multimedia session. Hence, the context of the multimedia session was in this case transferred to the second PDN.

At step 460, the MS becomes active again and connects to the second PDN, for example by sending a registration message. As a result, the second PDN sets up a second network attachment comprising a second PPP connection to the MS and assigns a second IP address to the MS at step 470. As in the case of FIG. 4, the context of the multimedia session was earlier fetched at the first AF and sent to the second PDN, the second PDN now sends, at step 480, the context of the multimedia session to the second PDF. The second PDF sends the context of the multimedia session to the second AF at step 490. The MS sends the second IP address to the AF at step 499, e.g. by use of a SIP update message. As the context of the multimedia session is present in the second AF, said multimedia session may continue.

The same teachings of the present invention as described in FIGS. 3 and 4 would also apply in another exemplary use wherein a multimedia session would support a gaming session between a user of a MS and a game server having a communication with an AF, whether or not SIP was used as a call control mechanism. The present invention applies to any network supporting a real time service over a multimedia session.

Figure 5:
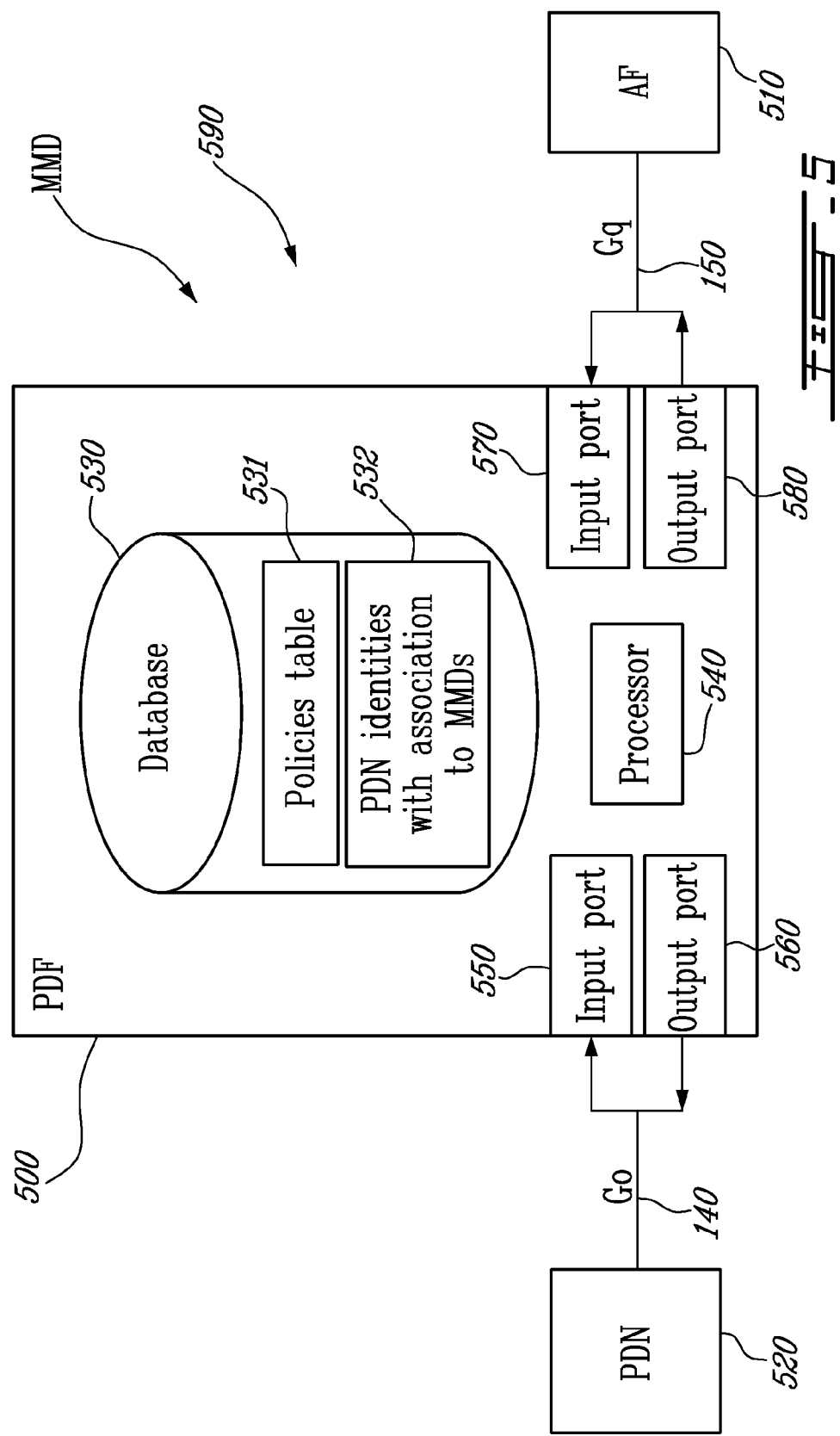
FIG. 5 shows a schematic description of a Policy Decision Function node.

Reference is now made to FIG. 5, which shows a schematic diagram of a PDF (Policy Decision Function) 500 of a MMD 590, as per a preferred embodiment of this invention, with interfaces to an AF 510 and to a PDN 520. The PDF 500 comprises a database 530 for storing a first table 531 containing policies and a second table 532 containing PDN identities with association of said PDN identities with MultiMedia Domains, a processor 540 for coordination, enforcement of policies and translation of parameters, a Go interface input port 550 for receiving messages from the PDN on the Go interface 140, a Go interface output port 560 for sending messages to the PDN on the Go interface 140, a Gq interface input port 570 for receiving messages from the AF on the Gq interface 150, and a Gq interface output port 580 for sending messages to the AF on the Gq interface 150. For example, when a user initiates a VoIP session, the PDN sends a VoIP call set up request to the PDF 500 on the Go interface 140. Said VoIP call set up request is received from the PDN 520 on the Go interface input port 550. The processor 540 translates the VoIP call set up request into an allocated bandwidth by consulting policies in the first table 531 to obtain a policy stating a bandwidth that can be allocated to the VoIP session.

Referring now at once to FIGS. 4 and 5, the state report message sent at step 410 from the first PDN to the first PDF is received on the Go interface input port 550. The determination at step 415 by the first PDF, where it is verified whether or not the second PDN is in the same MMD, based on the identity of the second PDN received in the state report message, is made by the processor 540, which consults the second table 532 containing PDN identities with associations of said PDN identities with MultiMedia Domains. If the processor 540 determines that the second PDN is in the same MMD, the processor may optionally select that the network detach message will not comprise a request to fetch the context of the multimedia session. If the processor 540 determines that the second PDN is not in the same MMD or, alternatively, if the state report message does not comprise an identity of the second PDN, the processor selects that the network detach message will comprise a request to fetch the context of the multimedia session. The network detach message, which is sent at step 420 to the first AF, is sent on the Gq interface output port 580. The network detach response, sent by the first AF at step 430 is received on the Gq interface input port 570. The state report response, sent to the first PDN at step 440 is sent on the Go interface input port 560. The context of the multimedia session sent by the second PDN to the second PDF at step 480 is received on the Go interface input port 550. Said context of the multimedia session sent from the second PDF to the second AF at step 490 is sent on the Gq interface output port 580.

Although several aspects of a preferred embodiment of the method and PDF of the present invention have been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. In a network wherein a Mobile Station (MS) has a multimedia session with a first MultiMedia Domain (MMD) comprising a first Packet Data Node (PDN), a first Policy Decision Function (PDF) and a first Application Function (AF), a method for maintaining said multimedia session for said MS following a release of a first network attachment between said MS and said first PDN consecutive to a handoff from said first PDN to a second PDN, comprising the steps of:

sending from said first PDN to said first PDF a state report message indicating that said first network attachment to said MS has been released;

sending from said first PDF to said first AF a network detach message indicating that the multimedia session is requested to be maintained;

responsive to said network detach message, maintaining at said first AF said multimedia session and fetching at said first AF a context of said multimedia session;

sending a network detach response from said first AF to said first PDF, said network detach response comprising an acknowledgement and further comprising said context;

sending a state report response from said first PDF to said first PDN, said state report response comprising an acknowledgement and further comprising said context; and sending said context from said first PDN to said second PDN.

2. The method of claim 1, further comprising the steps of:

receiving at said second PDN a registration from said MS; and responsive to said registration, setting up a second network attachment at said second PDN.

3. The method of claim 2, further comprising the steps of:

responsive to said registration, sending said context from said second PDN to a second PDF; and sending said context from said second PDF to a second AF.

4. The method of claim 1, wherein:

in the step of sending from said first PDF to said first AF said network detach message indicating that the multimedia session is requested to be maintained, said state report message further comprises an identity of said second PDN;

the method further comprises a step of, responsive to receiving said state report message, determining at said PDF whether or not said second PDN is associated with said first MMD; and in the step of sending from said first PDF to said first AF a network detach message indicating that the multimedia session is requested to be maintained, said network detach message further comprises an indication whether or not the second PDN is associated to said first MMD.

5. The method of claim 4, wherein:

fetching at said first AF a context of said multimedia session;

including said context in said network detach response;

including said context in said state report response; and sending said context from said first PDN to said second PDN;

are conditional to said second PDN not being associated to said first MMD.

6. The method of claim 5, wherein said second PDN is associated with said first MMD.

7. The method of claim 1, wherein said first PDN and said first PDF are connected with a Go interface and wherein said first PDF and said AF are connected with a Gq interface.

8. A Policy Decision Function (PDF) in a MultiMedia Domain (MMD) for maintaining a multimedia session for a Mobile Station (MS) following a release of a network attachment between said MS and a first Packet Data Node (PDN), comprising:

a Go interface input port connected towards said first PDN for receiving a state report message, said state report message comprising an indication that said network attachment to said MS has been released;

a Gq interface output port connected towards an AF for sending a network detach message, said network detach message comprising a request to maintain the multimedia session;

a Gq interface input port connected towards said AF for receiving a network detach response, said network detach response comprising an acknowledgement and comprising a context of said multimedia session; and a Go interface output port connected towards said first PDN for sending a state report response, said state report response comprising an acknowledgement and comprising a context of said multimedia session.

9. The PDF of claim 8 wherein said state report message optionally comprises an identity of a second PDN.

10. The PDF of claim 9, also comprising:

a table containing identities of Packet Data Nodes; and a processor for verifying PDN identities.

11. The PDF of claim 10, wherein:

said table containing identities of Packet Data Nodes further comprises an association of Packet Data Nodes with MultiMedia Domains.

12. The PDF of claim 11, wherein:

said network detach message comprises a request to fetch said context of said multimedia session when said first PDN and said second PDN are not associated with a same MMD.

13. The PDF of claim 12, wherein:
said network detach message comprises a request to fetch said context of said multimedia session when said state report message does not comprise a PDN identity.

14. The PDF of claim 13, wherein:
said state report response comprises said context of said multimedia session on a condition that said network detach message comprises a request to fetch said context.

15. The PDF of claim 13, wherein:
said network detach response comprises said context of said multimedia session on a condition that said network detach message comprises a request to fetch said context.

* * * * *

UNITED STATES PATENT AND TRADEMARK OFFICE
CERTIFICATE OF CORRECTION

PATENT NO.       : 7,551,585 B2                                   Page 1 of 1
APPLICATION NO.  : 11/238958
DATED            : June 23, 2009
INVENTOR(S)      : Foti et al.

It is certified that error appears in the above-identified patent and that said Letters Patent is hereby corrected as shown below:

In Column 3, Line 5, delete "PDN 20," and insert -- PDN 120, --, therefor.

In Column 3, Line 7, delete "PDN 20" and insert -- PDN 120, --, therefor.

In Column 12, Line 53, in Claim 9, delete "8" and insert -- 8, --, therefor.

Signed and Sealed this

Twenty-fourth Day of November, 2009

David J. Kappos
*Director of the United States Patent and Trademark Office*